United States Patent Office 3,404,458
Patented Oct. 8, 1968

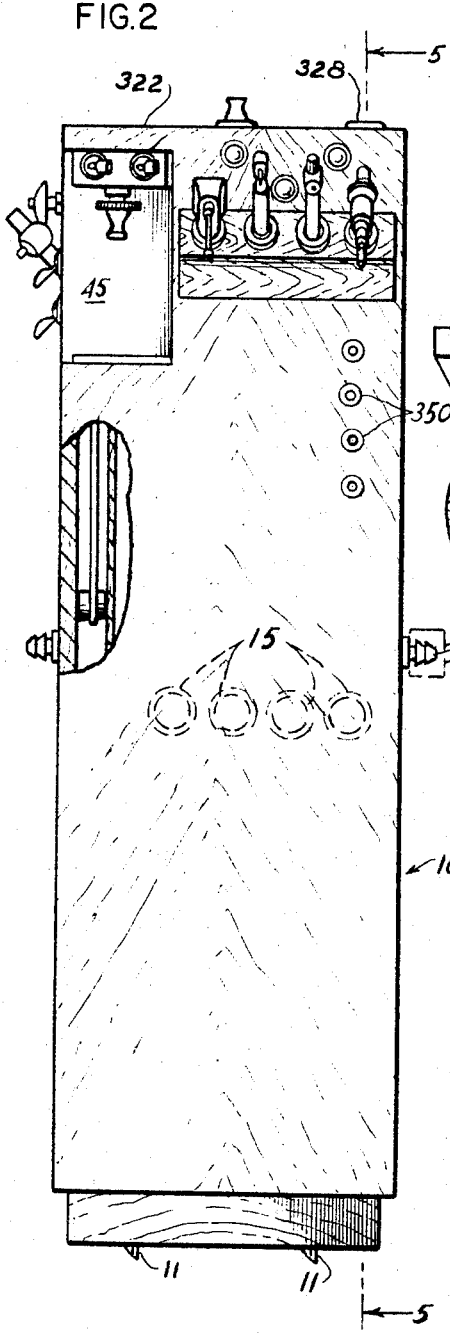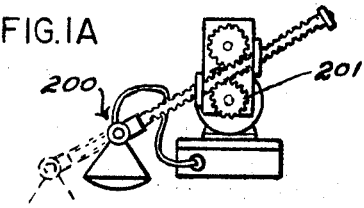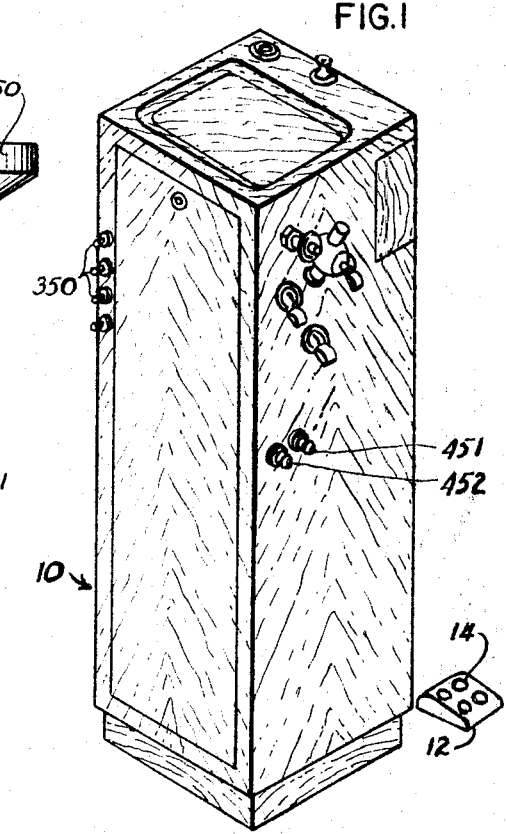

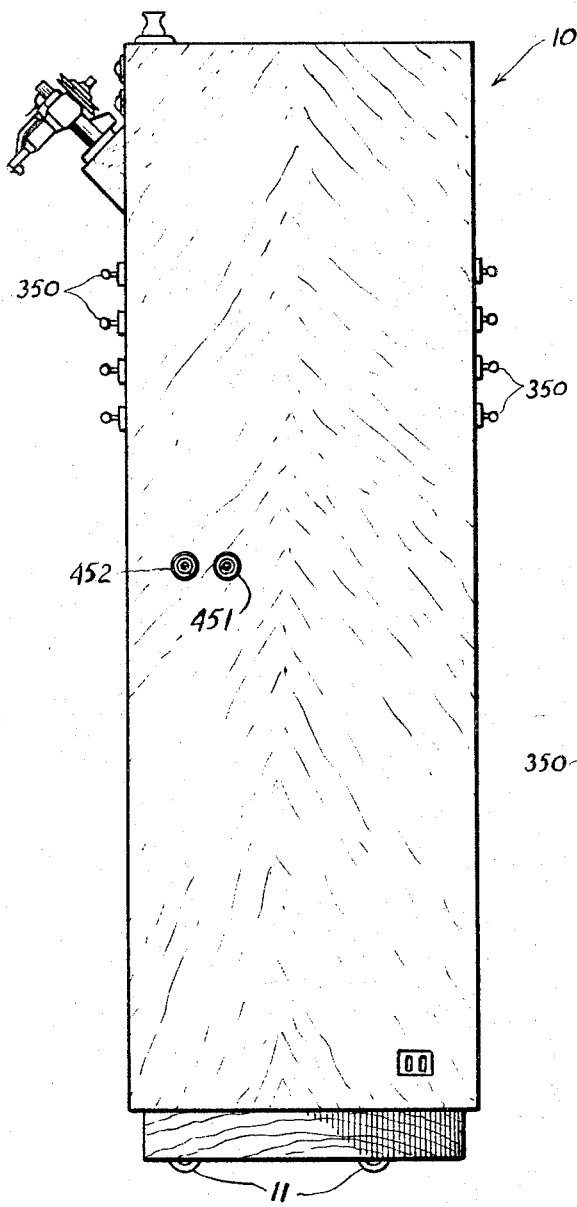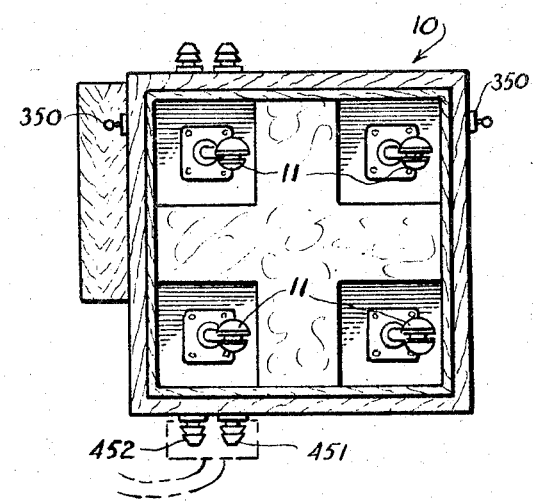

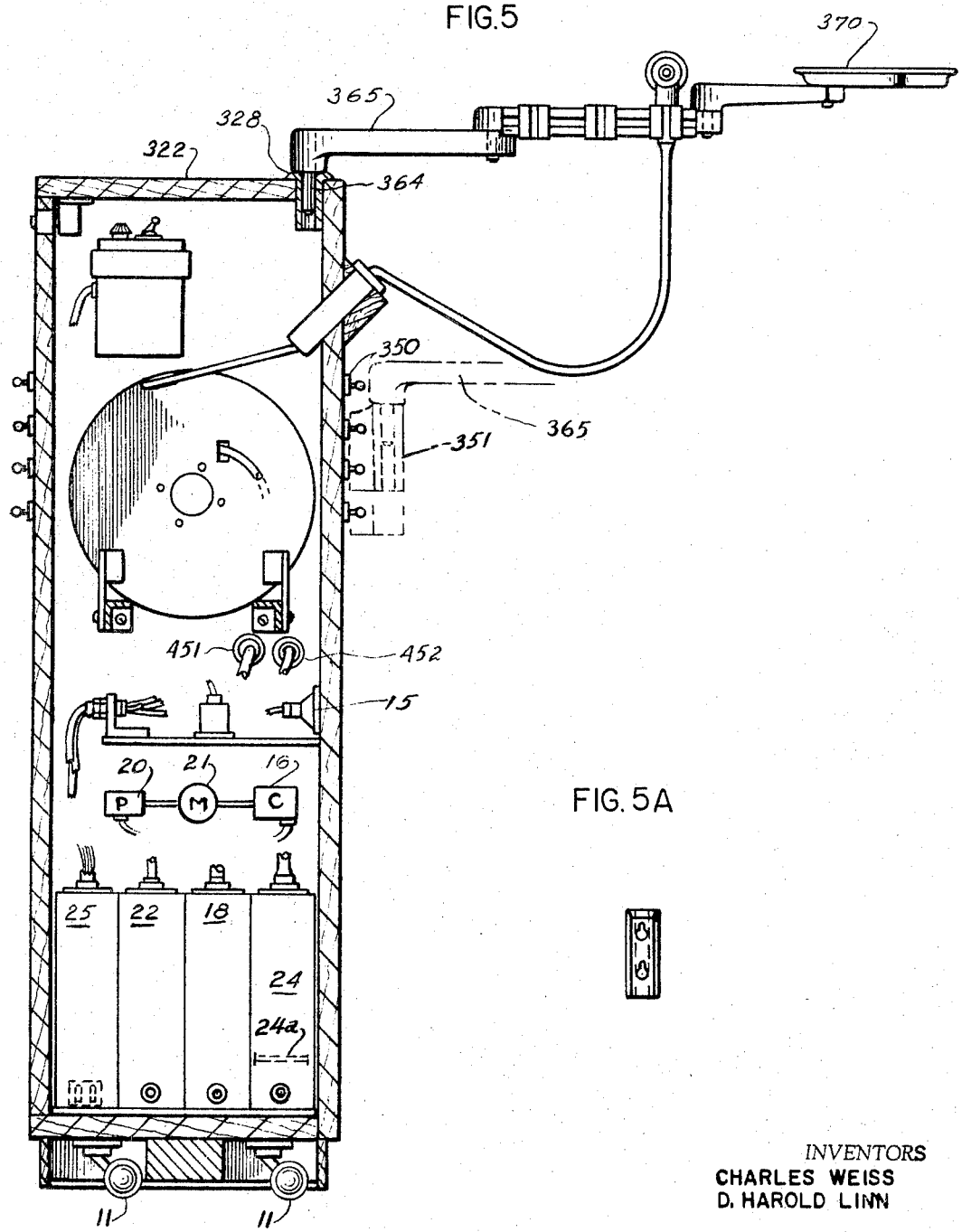

3,404,458
AUTOMATED DENTAL UNIT
Charles Weiss and David Harold Linn, New York, N.Y., assignors to S. S. White Company, Philadelphia, Pa., a corporation of Pennsylvania
Continuation-in-part of application Ser. No. 309,232, Sept. 16, 1963. This application Apr. 12, 1965, Ser. No. 447,416
8 Claims (Cl. 32—22)

ABSTRACT OF THE DISCLOSURE

A portable dental unit including conventional handpieces and having self-contained plumbing means, power means, compressed gas means, suction means, waste collection means, such that no external connections are required in order to make the dental unit fully operative. The dental unit also is shown in combination with remote control actuating means whereby various functions of the dental unit can be actuated from a distance. The dental unit is provided with an adjustably mounted tray, cuspidor and dental light whereby the unit is readily convertible for use in practicing dentistry with conventional techniques or with the new time-motion technique.

---

This is a continuation-in-part of our copending patent application Ser. No. 309,232, filed Sept. 16, 1963, and now Patent No. 3,302,290.

This invention relates to dental cabinet units of the type commonly utilized to facilitate operations by a dentist upon a patient; and more specifically describes a dental unit of the above type that will provide the ultimate assistance for the dental practitioner.

In performing dental operations, it is often necessary for the dental practitioner to alter the position of the dental unit or dental operating stand relative to the patient, or the practitioner. Such movements of the dental units are necessary both prior to the commencement of the operation and often during the operation itself. In our prior co-pending application, Ser. No. 309,232, we disclosed a unit that is entirely movable and flexible and can be utilized during traditional operations as well as when utilizing the newer time-motion techniques.

It is often difficult for a dentist to move the necessary equipment, such as the dental handpieces and the like, laterally or vertically to the proper position for operation on the patient. Often the dentist must discontinue the operation for short periods of time and must adjust the dental units thereby bringing the dental handpieces to the proper operating position, in order to continue the operation. For this reason, dentists often find that assistants are necessary to adjust the position of the dental unit relative to the practitioner.

Still further, the degree of movement of the dental units available today is usually somewhat limited and the most desirable position of the unit can often not be obtained no matter what effort is utilized to attempt to adjust the same.

It is a cardinal object of this invention, therefore, to provide a dental operating unit that may be utilized by a dental practitioner and that may be convenient to any operation, or position of the patient and dental practitioner.

It is another primary object hereof to provide a unit as above described that may be freely moved as desired to the proper dental operating position.

Another primary object of this invention is the description of a dental instrument stand with automatic controls, and that will not require physical connection to other pieces of equipment, therefore being capable of almost infinite adjustment and movement.

A still further purpose and accomplishment of the instant invention is the provision of an improved dental equipment stand that may be easily mass-produced.

An ancillary function and accomplishment hereof is the description of a dental equipment stand that will permit operating techniques never before considered available to the dental practitioner in view of the limitations of dental equipment stand designs.

A further object and accomplishment is the provision of a dental equipment stand that may be moved about with the dental practitioner and that may even be utilized in many different rooms or locations as desired.

The above objects and accomplishments of the instant invention are accomplished by the provision of a dental equipment stand with built-in automated controls, that may be activated remotely either by a suitable electromagnetic wave system, by a sound system, by a light-sensing system or the like.

With these objects in view, the invention consists of the novel features of construction and arrangement of parts which will appear in the following specification and recited in the appended claims, reference being had to the accompanying drawings, in which the same reference numerals indicate the same parts throughout the various figures, and in which:

FIG. 1 is a view in perspective of the instant invention with a foot controller.

FIG. 1A is a fragmentary elevational view of a dental lamp associated therewith and controls therefor.

FIG. 2 is a side elevational view of the exterior of the unit.

FIG. 3 is a side elevational view of the unit taken from the right side of FIG. 2, with the cuspidor removed.

FIG. 4 is a bottom plan view of the instant invention.

FIG. 5 is a sectional elevational view taken substantially along line 5—5 of FIG. 2 showing the interior of the dental unit, and a dental tray assembly which may be utilized therewith.

FIG. 5A is an elevational view of collar 351 of FIGURE 5.

There is disclosed herein an exemplary embodiment of the invention. This exemplary embodiment contains in particular the following features and others described in greater detail in the specification hereinafter.

The dental unit 10 herein shown in completely self-contained and is mobile. Additionally, an embodiment is contemplated that is portable.

In conventional units of the described type, there are a great number of plumbing, water, vacuum and suction, power and waste connections that are necessary. These connections are usually made through the floor directly under the unit or through an "umbilical" cord. It is primarily these connections which result in a fixed construction which is adaptable only for limited usage and in connection with only one dental operating chair. A prime feature of this device is the elimination of the fixed or other connections with the permanent apparatus in the dental operating room. All of the power, plumbing, waste, vacuum and suction, air, etc., supplies are self-contained within the said unit 10. It is apparent that this will make for a more versatile unit.

The unit 10 is mounted on wheels 11 or the like for movement about the dental operating room, or from room to room, or from place to place. It, therefore, requires little or no expense for the dentist to change from one room to another, from one office to another, or from one building to another. Plumbing, electrical connections, etc., are entirely eliminated. Additionally, dental schools and clinics will effect great efficiencies resulting from the obvious advantages flowing from such a construction. Further, dental practitioners are able to convert almost any room to a dental operating facility merely by providing a dental unit as described herein, with all supplies self-contained.

In another contemplated embodiment of the invention, air jets are provided under the unit (not illustrated). The resulting cushion of air directly under the unit 10 will make unnecessary the wheels 11 and will insure that the practitioner can freely move the unit 10 as desired.

In the primary embodiment of the invention herein disclosed, there is no cord or other direct connection between the foot or other controller 12 or the like, and the unit. It is contemplated that any remote actuating unit 14 and sensing unit 15 can be utilized in conjunction herewith. By way of example, electro-magnetic wave actuation coupled to the sensing unit 15 within the dental stand can be incorporated or a high or low frequency sound wave may be utilized or photoelectric effects may be utilized, or the like.

Thus, the controller 12 will emit a signal from the actuating unit 14 which will be detected by the sensing unit 15 thereby actuating the desired function of the dental unit 10 through suitable relays, solenoids and valves. Any number of such signal controllers may be supplied as necessary or desirable.

Additionally, the same system may be utilized to control other devices such as the position of the lamp 200. The lamp 200 may be mounted for movement by drives 201 and the actuation of the drives 201 may be remotely controlled by the controller 12.

In conventional units of the type described, compressed air is usually available through the utilization of an exterior mechanical compressor or the like. The instant invention makes such apparatus no longer necessary. The conventional expensive, bulky, and inefficient compressors are replaced by one or more of the following devices.

In one embodiment contemplated, a highly compressed gas may be contained within the dental unit 10. The compressed gas could be utilized to supply the compression medium for air, gas, or the like. In the illustrated embodiment of the invention, the compressed air is produced by a small compressor 16, within the dental unit 10. A storage tank 18 is utilized to store the air and minimize the size of the compressor required. The air compressed, and stored within the tank, is utilized in the manner set forth heretofore.

In conventional units, it is necessary to utilize a high velocity suction or vacuum mechanism in conjunction with some of the dental instruments. The instant invention provides a device for this accomplishment in one of several alternative manners. For example, the well known venturi system could be utilized in conjunction with the compressed gas to supply the desired suction or vacuum mechanism. Additionally, if required, an individual suction pump 20 can be incorporated. In this regard, it is to be noted that the same power device such as motor 21, can be utilized alternately to supply compressed gas or air and the required suction or vacuum.

Water is stored within a tank 22 within the unit and held ready for use. It may be forced to exit from the unit through the dental instruments when desired, by being held under pressure of the compressed gas from the tank 18.

A container 24 is supplied within the unit to receive and store the suction evacuation waste. This tank is positioned for easy removal for cleaning or replacement from time to time. The usual filter 24a is provided to collect the precious metals in the waste for salvage purposes.

Electrical power is provided through a rechargeable or replaceable battery 25. If the battery is rechargeable, the unit may be plugged in over night for this purpose.

Referring now more particularly to the drawings, the exterior features of the unit, together with the water niche 45, the dental instruments, the cuspidor 450, are similar to that shown and described in our prior co-pending application Ser. #309,232, now Patent No. 3,302,290. Reference is made to that specification for a complete explanation of the details of the exterior portions of the device except as set forth herein.

In the usual unit, as well as any of the conventional prior art, a flexible "umbilical" cord or rigid floor piping, connects the unit 10 to the plumbing, power, vacuum and suction and air supplies, as well as to the controls. The instant unit 10 is characterized by the absence of any such connections. As previously described, the air supply, the electrical supply, the water supply and the suction and vacuum supply, are all contained within the said unit 10.

As illustrated in the drawings, all of the above may be supplied in a pack at the bottom of the interior of the unit 10. Thus, any of the individual tanks or compartments may be removed for supply or cleaning as desired, or the entire pack may be removed as necessary. It is further contemplated that in any additional embodiment of the invention, the skin or walls of the unit 10 may be fabricated to be hollow, to act as storage space for the required water, air and the like.

It is to be emphasized that although the use of air is described and set forth throughout this specification, other well known gases such as carbon dioxide, nitrogen and the like may be utilized in place of the said air. Positioned immediately above the said tanks for the storage of water, air and the like is a motor 21 which may act as a power supply for the compressor 16 and for the suction or vacuum pump 20.

Thus, it will be seen that the incorporation entirely within the unit of the required air or gas, water, evacuation space, and electrical supply, will serve to permit the complete absence of the usual flexible "umbilical" cord or rigid piping, connecting the dental unit to the usually required extensive plumbing, air, power, vacuum and suction supplies.

Other advantages are obtainable from the device described herein.

For example, it will be preferable at times to provide means whereby the dental operating equipment may be moved to positions closer or even in juxtaposition to the patient. For this purpose, dental operating extension means are provided as shown in FIG. 5 of the drawings.

As shown, a bushing 328 is provided in the top surface 322 of the unit. The said bushing 328 has an internal diameter of sufficient size to receive a shaft-like extending member 364 connected to one end of a horizontal member 365. The horizontal extending member 365 has an opening at the opposite end thereof of sufficient size to receive a similar shaft-like extending member. This shaft-like extending member is adapted to receive other like units, terminating in a tray 370.

At times, however, it is desirable to mount the extending arms and trays at elevations lower than that permitted by mounting at the top of the unit 322. For this purpose, a plurality of vertically aligned brackets are provided at one or more sides of the unit. Each pair of the vertically aligned brackets 350 is adapted to retain a collar 351. The collar 351 in turn will receive and rotatably support a tray 370 extending arm in the manner similar to that described hereinabove (shown in phantom).

Thus, should it be necessary or desirable to mount the tray extending arms at a position commencing lower than the top of the unit, any pair of the vertically extending brackets 350, together with the collar 351, may be utilized for this purpose.

It will be of additional interest to describe the operation and connections of the cuspidor 450. As illustrated, the cuspidor 450 is attached by semi-rigid connections to the unit. For this purpose, quick-disconnect couplings 451 and 452 are provided in one or more sides of the unit to receive the water and vacuum lines from the cuspidor 450. The quick-disconnect and connect couplings 451 and 452 on the water and vacuum supplies to the cuspidor 450, make possible the entire removal of the cuspidor 450 when desired or necessary. The cuspidor 450 will be held by a "goose-neck" tube so as to be adjustable to any desired position.

All of the features described above and the others mentioned herein are especially important in view of the new dental operating techniques currently becoming popular. The newer so-called "time-motion" techniques require extensive positioning of the dental unit 10 about the patient. At present, however, the success of the new operating techniques is severely limited by the rigidity of the available equipment. The instant invention for the first time truly provides a completely adaptable and movable unit without the usual limitations. Any of the principles of the newer operating techniques may thus be incorporated when utilizing the present unit. Of course, as previously observed, the instant invention will provide advantages even when the more traditional techniques are utilized.

The utilization of the remote controller 12 in conjunction with the dental unit 10, to activate the instruments on the unit, as well as other necessary equipment such as the light and the like, are of extreme importance. The controller 12 illustrated in the drawings is a foot controller, but it is to be understood that the controller 12 may be positioned in any of the usual or convenient places. For example, the controller 12 may be mounted on the sides or back of the dental operating chair, on other available cabinets, or on the walls, and further may be actuated by the hand, foot, knee, or head of the dental practitioner.

While there are above disclosed but a limited number of embodiments of the structure and product of the invention herein presented, it is possible to produce still other embodiments without departing from the inventive concept herein disclosed, and it is desired, therefore, that only such limitations be imposed on the appended claims as are stated therein, or required by the prior art.

Having thus described our invention and illustrated its use, what we claim as new and desire to secure by Letters Patent is:

1. A portable dental unit comprising a movable stand, a plurality of dental handpieces carried by said stand, said stand being provided with self-contained plumbing means, power means, compressed gas means, suction means, and waste collection means, said power means being operable for actuating said suction means, said compressed gas means being connected to at least one of said dental handpieces.

2. A portable dental unit as in claim 1 wherein said power means is connected to said compressed gas means for maintaining an adequate supply of compressed gas.

3. A portable dental unit as in claim 1 in combination with a remote control actuating unit for selectively actuating at least one of said plurality of dental handpieces, 4. A portable dental unit as in claim 3 wherein a sensing unit is mounted on said dental unit for detecting signals emitted by said actuating unit.

5. A portable dental unit as in claim 1 including a dental tray, first mounting means carried by said stand at an upper end thereof for mounting said dental tray on said stand, second mounting means carried by said stand at a point spaced from said first mounting means, and connection means carried by said dental tray for selectively cooperating with said first and second mounting means for connecting said dental tray to said stand.

6. A portable dental unit as in claim 3 in combination with an adjustably mounted dental light, drive means connected to said dental light for moving said dental light to various positions, said remote control actuating unit including means for controlling said drive means to vary the position of said dental light.

7. A dental unit including a plurality of dental handpieces, an adjustably mounted dental light, drive means connected to said dental light for moving said dental light to various positions, and a remote control actuating unit for selectively actuating at least one of said plurality of dental handpieces, said remote control actuating unit including means for controlling said drive means to vary the position of said dental light.

8. A portable dental unit as in claim 1 wherein said dental unit is provided with a cuspidor, and quick-connect-disconnect means for coupling said cuspidor to said plumbing means and suction means.

References Cited

UNITED STATES PATENTS

| 1,257,936 | 2/1918 | Russell | 32—22 |
| 1,495,673 | 5/1924 | Cliffton | 32—33 |
| 2,178,089 | 10/1939 | Walker | 340—147 |
| 2,345,472 | 3/1944 | Goldsmith | 340—148 |
| 2,427,078 | 9/1947 | Tucker et al. | 340—148 |
| 3,077,665 | 2/1963 | Saltzman | 32—22 |
| 3,081,542 | 3/1963 | Sherfey | 32—22 |
| 3,112,004 | 11/1963 | Neaville | 250—215 |
| 3,218,461 | 11/1965 | Saunders et al. | 250—202 |
| 3,280,462 | 10/1966 | Deeley | 32—22 |

FOREIGN PATENTS

| 1,000,466 | 2/1952 | France. |
| 1,259,306 | 3/1961 | France. |
| 383,805 | 10/1923 | Germany. |

LAWRENCE W. TRAPP, *Primary Examiner.*